May 17, 1960
A. E. SNOWDON
2,937,319
PROTECTIVE DEVICE
Filed Oct. 24, 1955
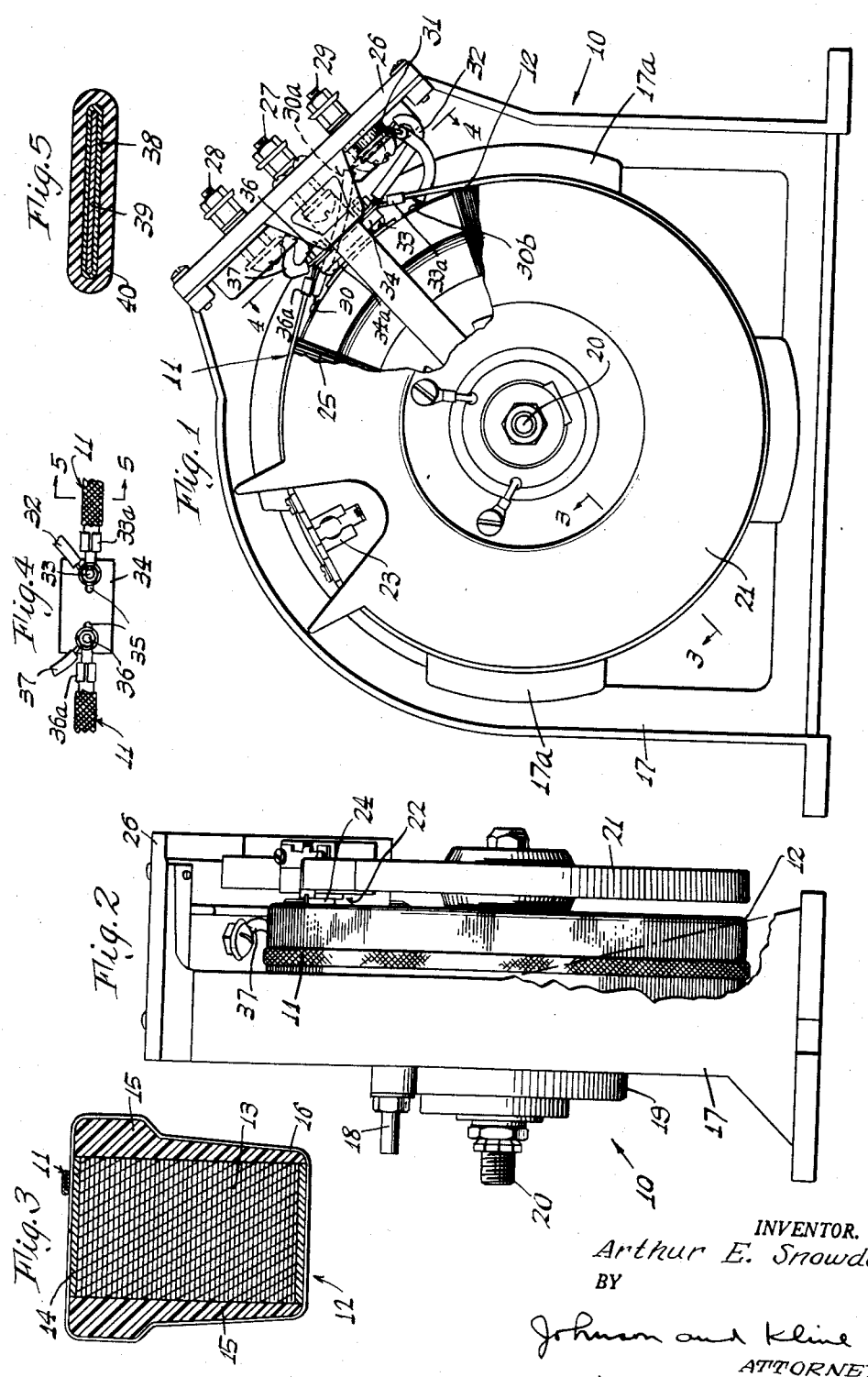
INVENTOR.
Arthur E. Snowdon
BY
Johnson and Kline
ATTORNEYS

United States Patent Office 2,937,319
Patented May 17, 1960

2,937,319
PROTECTIVE DEVICE

Arthur E. Snowdon, Bristol, Conn., assignor to The Superior Electric Co., Bristol, Conn., a corporation of Connecticut Application October 24, 1955, Serial No. 542,154

5 Claims. (Cl. 317—15)

This invention relates to electric equipment and particularly to an electrical device having a current-carrying coil wound on an iron core.

It is common practice to protect electrical equipment against dangerous overheating due to excessive current, which may be caused by a short-circuit or by an overload, by interposing in the circuit a fuse or circuit-breaker which is responsive to the excessive current flowing in the circuit.

With some electrical equipment, dangerous overheating can occur in part of the equipment or circuitry without any substantial change in the load current in the supply circuit. For instance, in a variable autotransformer dangerously excessive current may exist in the secondary circuit due to overload therein, or when one or several turns of the coil become short-circuited; yet, these conditions would not result in appreciable excessive current in the primary or supply circuit. A current-responsive fuse or circuit-breaker in the line of the primary circuit would not react and open the current supply under such conditions.

An object of this invention is to provide means for protecting electrical equipment against dangerous overheating which is responsive to heat generated in the electrical equipment to interrupt the supply of current to the equipment.

In some electric equipment such as a transformer, dangerous overheating may occur over a small area at any place along the winding, or it may occur over the entire winding without reflecting any substantial increase in the input current feeding the transformer.

It is another object of this invention, therefore, to so provide the protection means that it is responsive to heat developed locally and/or generally over the entire winding to open the current-supply circuit to the latter.

Thus, in a variable autotransformer the heat-responsive means may be, as in the exemplary embodiment of the invention illustrated herein, in the form of a single length of fusible wire, lying adjacent the coil and in heat-receiving relation thereto, the fusible wire having a melting point substantially below the temperature which would be reached upon dangerous overheating. The fusible wire forms a link in the circuit supplying current to the coil.

When, as shown, the coil is a toroid, wound on an iron core, it is advantageous to wrap the fusible wire around the circumference of the coil with every turn of the coil in good heat-conducting relation to the fusible wire so that localized or generally distributed, dangerously excessive heat generated in the coil will melt the wire and open the circuit. By this arrangement, there is no appreciable time lag in opening the circuit such as would occur if the mere rise in ambient temperature caused by excessive overheating were depended upon. Moreover, a localized heating, i.e. one or several turns of the coil being overheated, would not create a sufficient rise in temperature to actuate a protecting device depending solely on ambient temperature rise.

Besides functioning as a local and overall heat-responsive safety device, the fusible wire may be made of such material and of such cross-section that it will also respond to dangerously excessive current in the circuit regardless of cause; that is to say, the fusible wire may also function the same as an ordinary fuse to open the current-supply circuit.

Other features and advantages will hereinafter appear.

In the accompanying drawing:

Figure 1 is a front elevational view of a variable transformer embodying the novel fire prevention means of the present invention with some of the parts being broken away to show underlying structure.

Fig. 2 is a side elevation of the autotransformer of Fig. 1 with some of the parts being broken away to show underlying structure.

Fig. 3 is a section taken on line 3—3 of Fig. 1.

Fig. 4 is a detail of the fuse connecting means taken on the line 4—4 of Fig. 1.

Fig. 5 is a sectional view of the protective means taken on the line 5—5 of Fig. 4.

Referring now to the figures, the electrical protective device of the present invention is shown as applied to a toroidal type of variable autotransformer, the transformer being indicated generally by the reference numeral 10. The protective device of my invention is generally indicated by the reference numeral 11.

As shown, the toroidal coil assembly 12 of the autotransformer 10 has a laminated cylindrical metal core 13. Adhered to the core's circumferential periphery is a thin sheet material 14, which may be a varnished kraft paper or phenolic tubing, and on the core's sides are positioned molded plastic end pieces 15. The length of wire forming the coil 16 is wound over the material 14 and end pieces 15. The toroidal coil assembly 12 is supported within the frame 17 by insulating blocks 17a suitably located therein.

The autotransformer 10 has a control shaft 18 connected to a main operating shaft 20 through planetary gearing (not shown) in the casing 19. The shaft 20 has also attached thereto on the opposite side of the coil a radiator wheel 21 forming part of the voltage output regulator. A brush assembly 22 comprising a holder 23 and a carbon brush 24 is secured on the radiator wheel 21 for rotation therewith. The brush 24 may be selectively positioned along a commutator surface 25 provided on the coil 16 to control the output voltage by operation of the shaft 18.

The frame 17 has mounted thereon a terminal board 26 having a center terminal 27 and end terminals 28 and 29. A wire 30a connects one end of the coil 16 to the terminal 29. The other end 30b of the coil 16 is connected to a post 31 attached on the underside of the terminal board 26. A wire 32 leads from post 31 to a connecting stud 33 mounted on a bracket 34 (see Fig. 4). The bracket 34 is formed from insulating material and is provided with another stud 36. A line 37 leads from the stud 36 to the end terminal 28. If desired, an insulating sheet 34a may be interposed between the bracket 34 and the coil assembly 12.

According to the present invention, the protecting device 11 is connected in series with the coil in order to disconnect the electrical energy to the coil upon either a general or localized overheating caused by an overload or an internal short-circuiting thereof. The protecting device 11 consists of a single wire-like fusible rectangular wire 38 wrapped around the coil 16 to be in heat-conducting relationship with substantially every turn thereof. The ends of the wire 38 are attached to the posts 33 and 36 by means of squeeze lugs 33a and 36a. It will be appreciated that current to the coil 16 is supplied from the terminal 29 through the wire 30a to the end 30 of the coil. Then it flows from the other end 30b of the coil to the post 30, through the wire 32 to a stud 33, then through the fusible wire 38 to the stud 36 and through the wire 37 to the terminal 28.

The major portion of the device 11 is wrapped around the periphery of the toroidal core assembly in intimate heat-exchanging relation or contact for substantially all of the convolutions or turns of the wire forming the coil 16. To maintain the contact, the bracket 34 is provided with elongated slots 35 in which the studs 33 and 36 are positioned. The slots 35 permit adjusting the distance between the studs 33 and 36 which decreases the length of the member 11 in order to set and maintain it in heat-conducting contact with the turns of the coil 16.

The protecting member 11, as shown in Fig. 5, is substantially rectangular in cross-section and comprises a fusible rectangular wire 38 which may be an eutectic mixture of lead, tin and cadmium designed to fuse at about 145.5° C. Moreover, there is provided an internal core 39 of non-metallic material, such as a flux, which may be a composition formed of resin, stabelite and pine oil. This flux acts to prevent any splattering of the mixture when the wire 38 melts.

An insulating tube 40 preferably covers the protecting device 11. This tube may be formed of fiber glass provided with a coating of vinyl which is sufficiently thin to just fill the pores of the fiber glass but not act as a thermal insulator.

From the foregoing description, any conditions which would cause either the whole of the coil 16, any turn thereof to reach a temperature at which the protecting device is designed to fuse, will immediately open the circuit to the coil 16. Because of the positioning of the protecting means in such intimate, touching contact with substantially every turn of the coil, the protecting means is very quickly and effectively responsive to the temperature of each turn in addition to the ambient temperature of the whole autotransformer and the magnitude of the current in the entire coil. This is particularly advantageous in a variable autotransformer of the type disclosed because the condition in which internal short-circuiting and/or one turn carrying a large current is more apt to occur than in fixed ratio transformers. Moreover, this condition may occur over a large area of the coil or may be localized at only a few turns but the few turns may be located at any position on the coil. It will be apparent that the protective device of the present invention is particularly useful when employed to protect electrical equipment that is placed in hidden or unattended locations in which there is no attendant to observe the malfunctioning condition, which if persisted, may create a fire.

Variations and modifications may be made within the scope of the claims and portions of the improvements may be used without others.

I claim:

1. A protecting device for electrical equipment having at least an iron core and a length of wire wound on the iron core to form a coil, a source of alternating electrical energy connectible to the ends of the coil to energize the coil, and a fusible link placed in series with the coil and the source for disconnecting the coil from the source upon either the entire coil or a convolution thereof becoming dangerously overheated, said link extending transversely of the convolutions of the coil and being in heat-conductive contact with substantially each convolution of the coil.

2. The invention as described in claim 1 in which the fusible link comprises a fusible metallic member substantially rectangular in cross-section and having a non-metallic meltable flux core.

3. In combination with a length of wire wound on an iron core to form a coil having at least two convolutions, means connectible to a source of electrical energy for energizing the coil, means for de-energizing the coil upon substantially any single one of the convolutions thereof increasing in temperature beyond its safe limits, without increasing the ambient temperature of the core and coil beyond the safe limits, said means including a length of fusible wire mounted in heat-conductive relation with the convolutions to be responsive to the temperature of any single one of the convolutions when its temperature is beyond the safe limit.

4. An electrical device having protective means comprising a variable autotransformer having a frame; an annular core supported in said frame; a coil wound on said core and having leads at each end connected to a terminal board mounted on said frame; a brush adjustably movable along said coil for selective contact with convolutions of the coil to control the output voltage of the autotransformer; and a fusible link member extending along and in intimate heat-conductive contact with substantially all of the convolutions of the coil, said link member being connected in series with one of said leads whereby when an excessive localized heat is created in said coil the link member will melt and open said coil circuit and thereby prevent further damage to said autotransformer.

5. In combination with a length of wire wound on an iron core to form a coil, and having ends connectible to a source of electrical energy for energizing the coil, means for de-energizing the coil upon either the entire coil or a convolution thereof becoming overloaded and causing either the entire coil or a convolution thereof to increase in temperature beyond its safe limit, said means including an element responsive to the heat produced by the increase in temperature beyond the safe limit, and in which the element is a length of fusible wire in heat-conductive relation with substantially all of the convolutions of the coil.

References Cited in the file of this patent

UNITED STATES PATENTS

| | | |
|---|---|---|
| 2,089,434 | Schermerhorn | Aug. 10, 1937 |
| 2,484,212 | Ferris | Oct. 11, 1949 |
| 2,712,083 | Armstrong | June 28, 1955 |
| 2,782,283 | Schwennesen | Feb. 19, 1957 |